A. P. LEE.
LOADING DEVICE.
APPLICATION FILED MAY 10, 1915.

1,251,790.

Patented Jan. 1, 1918.
9 SHEETS—SHEET 1.

Fig. 1.

Witnesses:

Inventor:
Albert P. Lee
By
Atty.

A. P. LEE.
LOADING DEVICE.
APPLICATION FILED MAY 10, 1915.

1,251,790. Patented Jan. 1, 1918.
9 SHEETS—SHEET 7.

Witnesses:

Inventor:
Albert P. Lee
By May W. Zabel
Atty.

UNITED STATES PATENT OFFICE.

ALBERT P. LEE, OF CHICAGO, ILLINOIS, ASSIGNOR TO LEE LOADER & BODY CO., OF CHICAGO, ILLINOIS.

LOADING DEVICE.

1,251,790.  Specification of Letters Patent.  Patented Jan. 1, 1918.

Application filed May 10, 1915. Serial No. 27,232.

*To all whom it may concern:*

Be it known that I, ALBERT P. LEE, a citizen of the United States, residing at Chicago, in the county of Cook and State of Illinois, have invented a certain new and useful Improvement in Loading Devices, of which the following is a full, clear, concise, and exact description, reference being had to the accompanying drawings, forming a part of this specification.

My invention relates to loading devices and in many of its features is of particular use on a self-propelled vehicle. My invention of course has various uses and certain parts of the completed machine may be omitted or may have their uses independently of the entire device. This however will be readily deducible from my description herein specifically of a self-propelled loading or conveying truck, the particular device illustrated herein embodying all of the various features of my invention in some particular form in which they may be specifically carried out.

In the specific form which I am going to describe in detail herein, I have a self-propelled truck which is provided with a platform that can be raised or lowered. Upon this platform is a hopper for receiving material to be either loaded or unloaded or conveyed from place to place. The raising and lowering of the platform permits the hopper to be placed in position whereby it can most readily receive or discharge its load. The hopper is of the rolling variety so as to be able to dump or discharge the load to either side of the vehicle, or truck; the hopper is mounted upon rails and these rails are carried by the movable framework. These rails may then be tilted to one side or the other to cause the hopper to roll to the opposite side to discharge the load. The truck may be provided for instance with a gasolene engine as motive power for propelling the truck, which engine may also serve to raise and lower the platform. It of course might serve to tilt the track, but I can do this simply by hand and I thus show it herein as being done by hand.

The truck is further provided with a novel kind of loading bucket which has a more or less universal mounting so that it can be directed into the material that is to be thrown into the hopper; may then be properly moved in such a way as to take on a charge, and then may be properly moved to deposit this charge into the hopper. The movements of the loading bucket are also preferably caused by the prime mover which as stated in this case may be an internal combustion engine. Manual means are also provided to restore the hopper from its dumping position to its central position.

I will describe the before mentioned particular form of carrying out my invention more in detail by referring to the accompanying drawings illustrating this form, in which—

Figure 1:
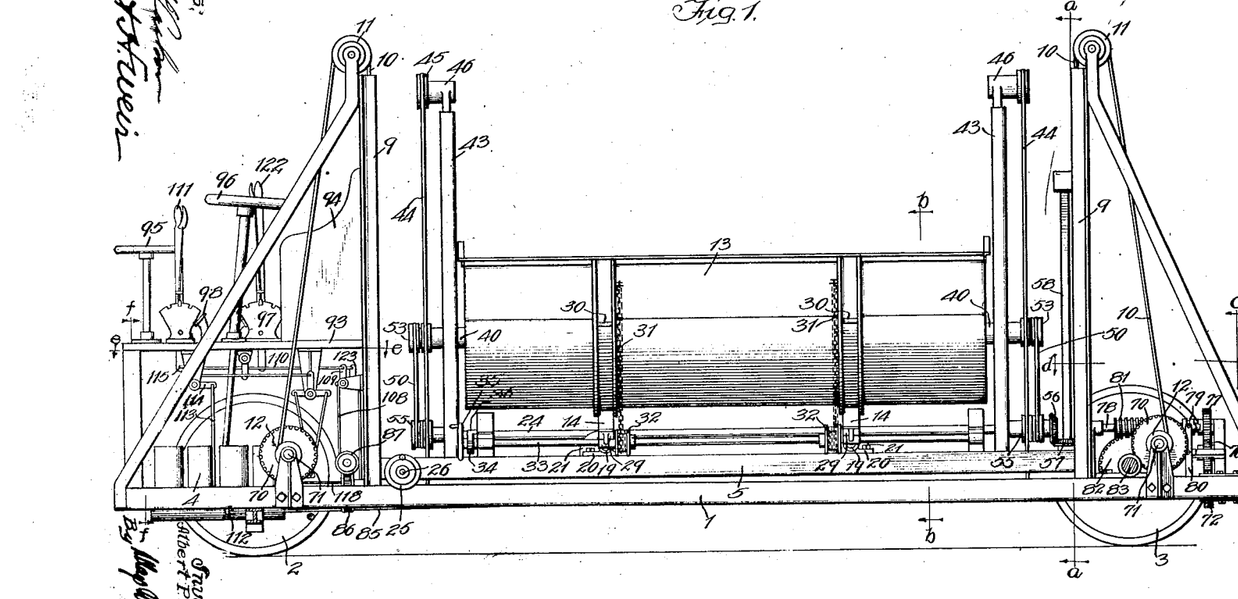
Figure 1 is a side view of a truck constructed in accordance with my invention, with a portion of the hood removed more clearly to reveal details.
Figure 3:
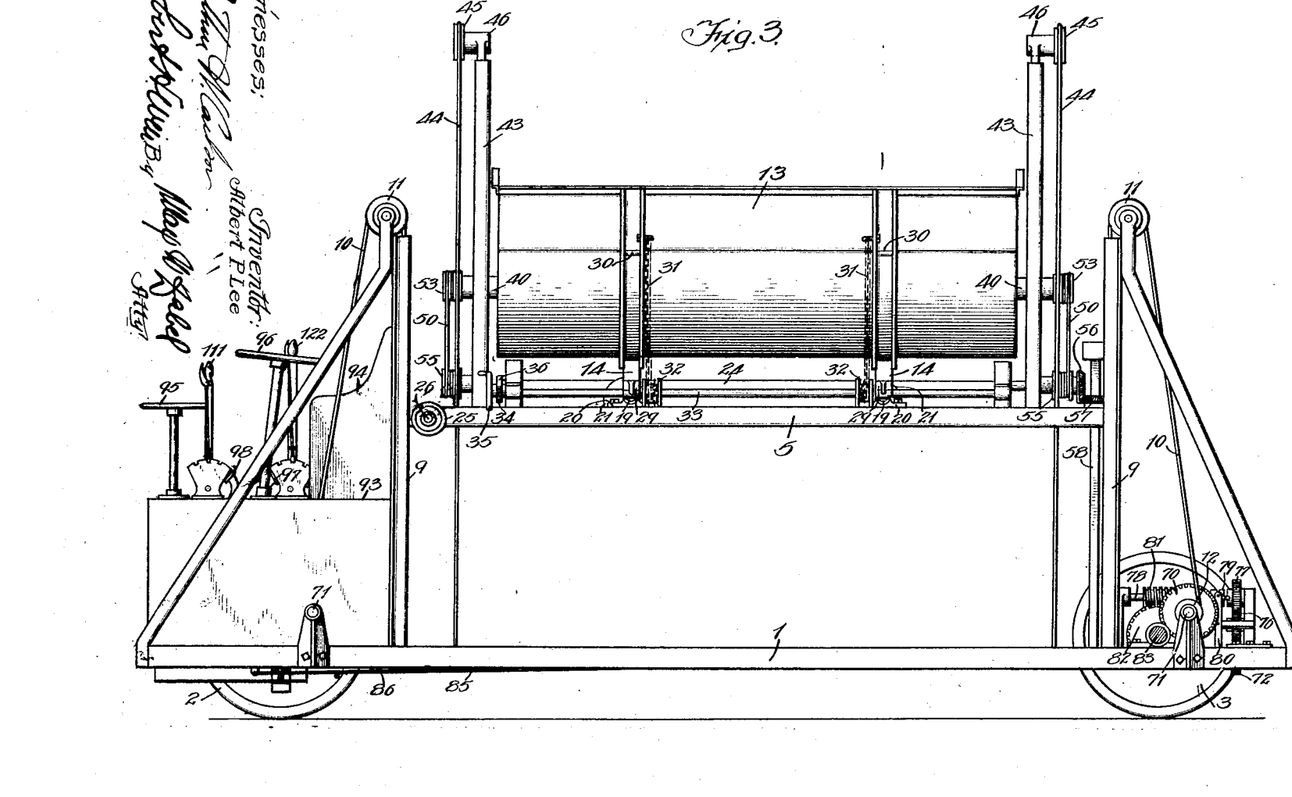
Fig. 3 is a view similar to Fig. 1 showing the platform in its alternative position.
Figure 4:
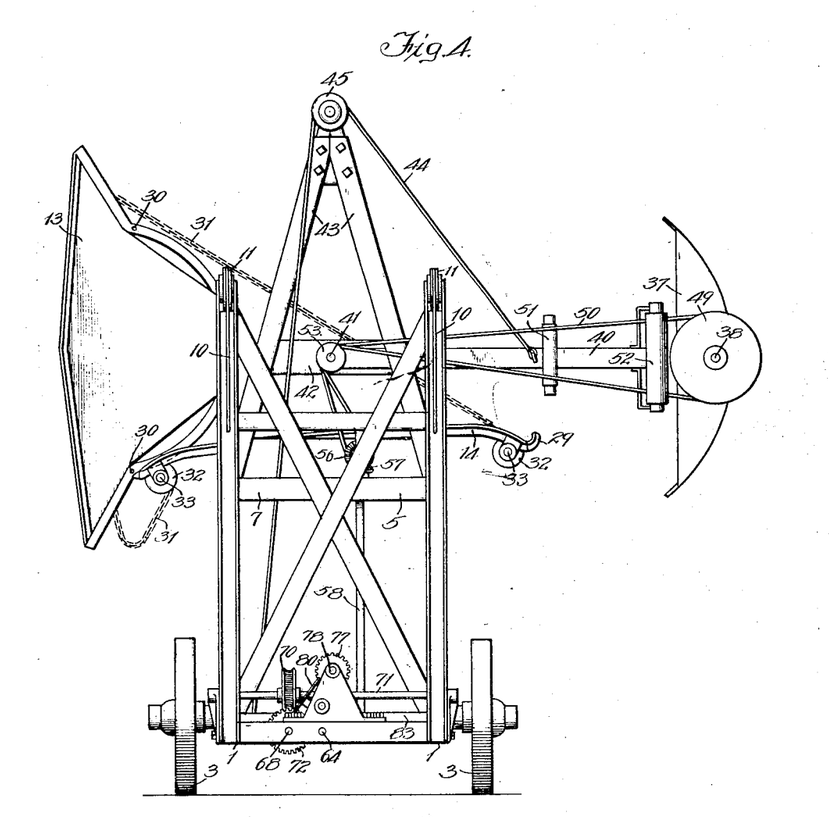
Fig. 4 is an end view of the truck with the hopper in its dumping position and with the platform in its raised position.
Figure 5:
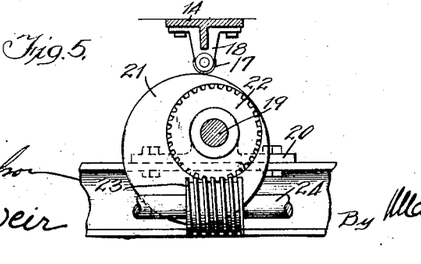
Fig. 5 is a detail view of the track tilting mechanism.
Figure 7:
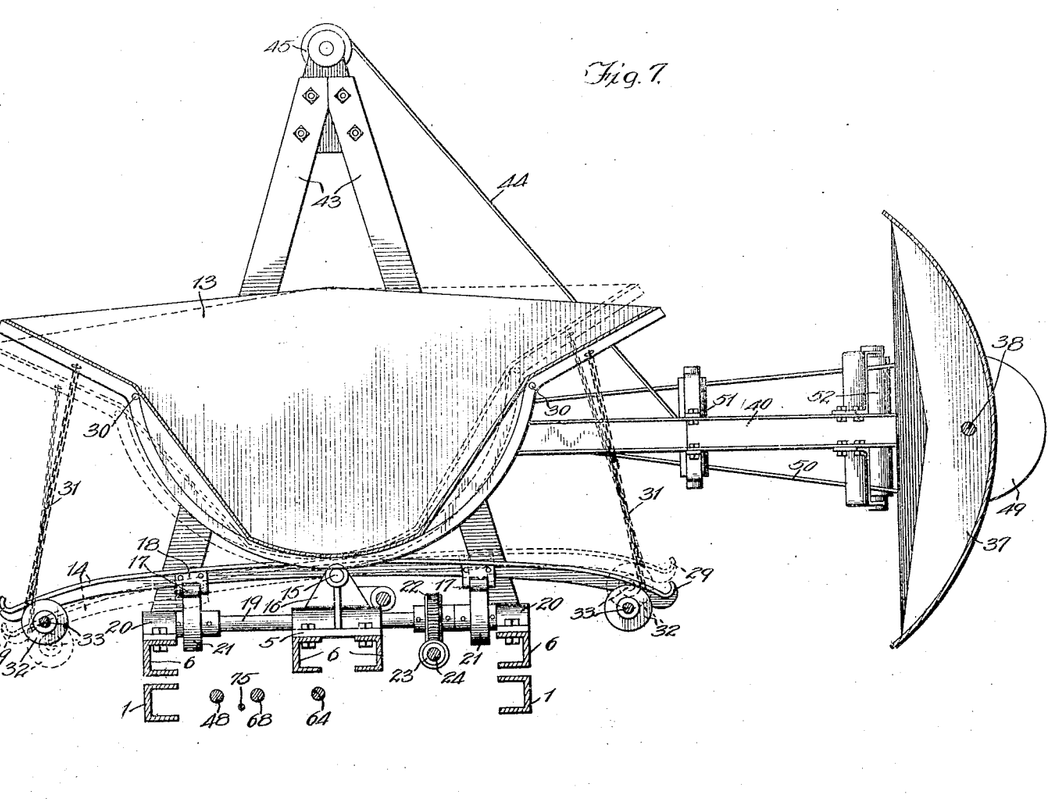
Fig. 7 is a sectional view on line *b—b* of Fig. 1.

My improved truck consists of a framework, the basic portion of which comprises the channels 1, 1, which carry the front or steering wheels 2, 2, and the drive wheels 3, 3. An engine 4 is used for driving and for other purposes as will presently appear. A platform 5 which may be raised and lowered includes channels 6, 6 as more clearly apparent from Fig. 7. These channels at their extremities are held together by crosspieces 7, 7 which have lugs 8, 8, that act as guides within the vertical channels 9, 9, both at the front and the rear of the vehicle. Thus the platform 5 is guided when it moves from the position of Fig. 1 to the position of Fig. 3, or higher. These lugs 8 are secured to ropes 10, which ropes go over sheaves 11, 11, and which ropes may be wound up upon drums 12, 12, as will all presently appear. These drums 12 are actuated by the engine as will also presently appear. The framework 5 carries a hopper 13, which hopper rolls upon rails 14, these rails as more clearly apparent from Fig. 7 being pivotally mounted upon shafts 15 mounted in brackets 16. The rails thus may tilt from the central position shown in Fig. 7 to the dotted position shown in Fig. 7 or to a reverse position should it be desired to tilt the rails clockwise instead of contra-clockwise. The rails are further provided at their opposite extremities with rollers 17 held in lugs 18. Shafts 19 carried in bearings 20 mounted upon the framework 5 are provided with cams 21, which cams engage the rollers and are so arranged that when the shafts 19 are rotated one side of the rails will move downwardly, and the other side will be forced upwardly by the cams, or vice versa. To drive the shafts 19, worm wheels 22 are provided upon the said shafts 19 which engage worms 23 mounted upon a shaft 24. This shaft 24 is suitably rotated by the hand wheels 25. The hand wheels 25 are secured to a shaft 26 which carries a bevel gear 27 driving a meshing bevel gear 28 mounted upon the shaft 24. Thus the hand wheels control the cams 21 to tilt the track either to one side or the other of the central position shown in Fig. 7. The rails 14 have curved fingers 29 at their extremities adapted to engage pins 30 provided upon the hopper 13 to permit complete rotation of the hopper when it reaches its limiting rolling position as shown more clearly in Fig. 4. The hopper is held in its central position by limit chains 31, which limit chains pass about sheaves 32. These sheaves on the opposite sides of the hopper are mounted respectively upon shafts 33, 33, which shafts are provided with ratchets 34, and which shafts likewise have hand wheels 35. Dogs 36 pivotally mounted to a stationary member when engaging their cooperating ratchet 34 prevent rotation of the shaft 33 in a way tending to unwind the chains 31. Thus if the hopper is to be dumped, the rails are first tilted and thereafter the corresponding dog thrown out of engagement with its ratchet 34, thus permitting the hopper 13 to roll to one side or the other depending upon the direction of tilt of the rails 14. In order to restore the hopper to its central position it is then necessary to operate the proper hand wheel 35 to wind up the corresponding chain 31 and place the corresponding pawl 36 into engagement with its corresponding ratchet. It is of course preferable to tilt the rails before the hopper receives its charge, chains 31 holding the hopper in its central position.

The general operation of the movements of the hopper as to its movement from charge receiving to its discharge position, and the movements of the platform as it is being raised or lowered will thus be clear. The dumping features of the hopper as stated are controlled preferably by hand, and the raising and lowering features of the platform through the intermediation of the rope 10 by the engine 4 will be presently described.

Figure 6:
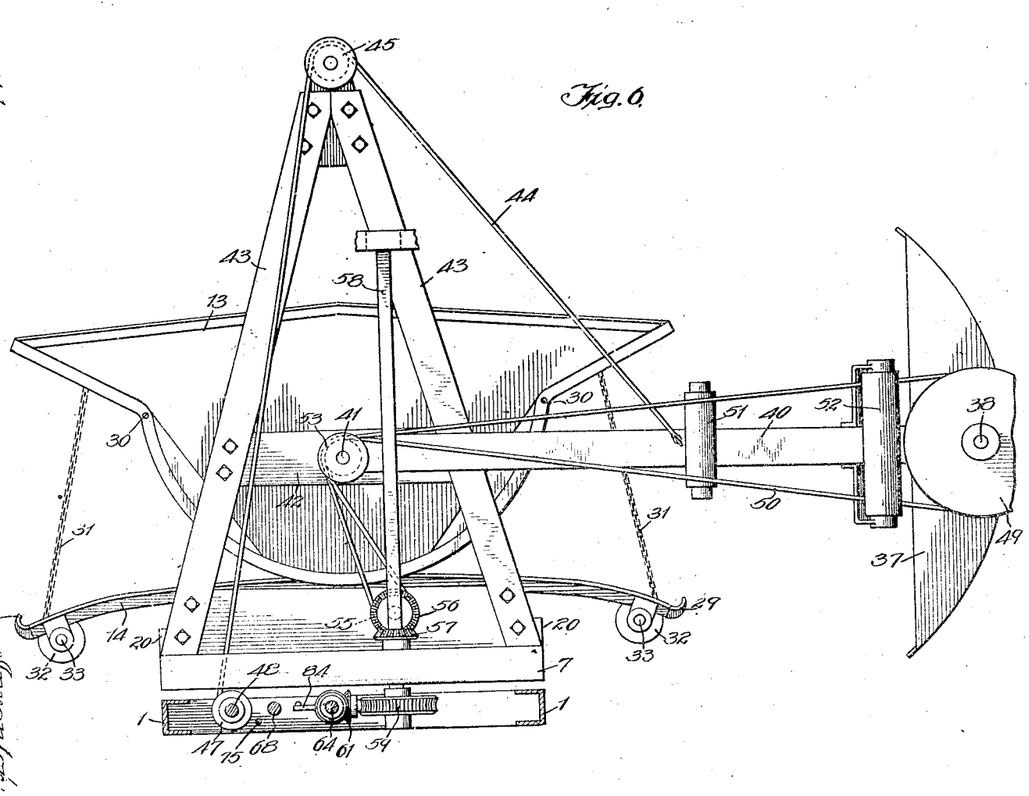
Fig. 6 is a sectional view along line *a—a* of Fig. 1.

The structure further includes as before stated means whereby the material may be transferred from a storage pile directly into the hopper 13 to be thereafter dumped into a waiting automobile or transferred in this same truck to be dumped at some other point. The loading means include the loading bucket 37 which is mounted fixedly upon the shaft 38 carried in the bearings 39. These bearings 39 form part of arms 40 which collectively might be called a boom. These arms 40 as more clearly apparent from Fig. 6 being pivotally mounted upon a shaft 41 carried by cross pieces 42 provided in the uprights 43 which are fixedly secured to and form parts of the raisable platform. It will thus be seen that the boom 40 can be swung up and down around its pivot 41. This may be accomplished through the agency of the ropes 44 which pass upwardly over sheaves 45 carried by arms 46 mounted on top of the uprights 43. This rope 44 then passes over a drum 47 fastened to the shaft 48, which shaft is operated by the engine as will presently appear.

Figure 2:
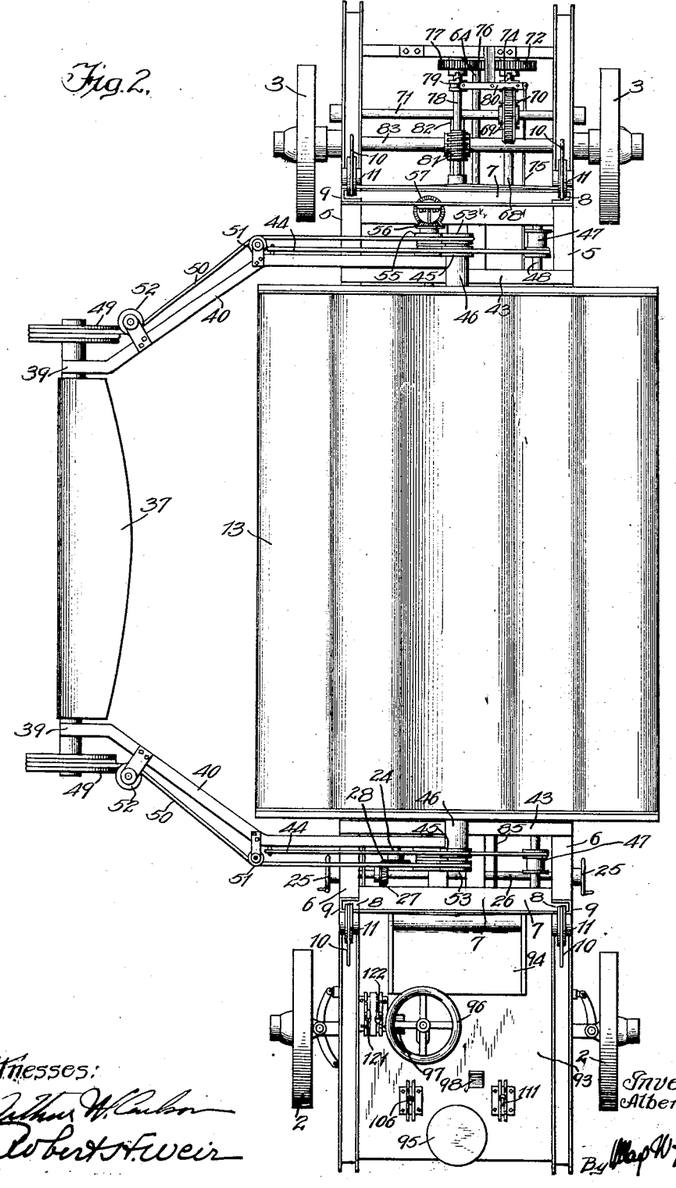
Fig. 2 is a top view of the truck shown in Fig. 1.

The shaft 38 upon which the bucket 37 is mounted is likewise fixed to sheaves 49, which sheaves are in association with ropes 50 so that as these ropes are moved to and fro the sheaves 49 are rotated thus to rotate the bucket 37. The ropes 50 are kept in alinement and properly guided by rollers 51 and 52 as is more clearly apparent from Figs. 2 and 6. The ropes 50 then pass around sheaves 53 pivotally mounted in cross-pieces 42 and then pass around driving sheaves 55. The sheaves 55 are fixedly secured to a shaft carrying the bevel gear 56, which bevel gear meshes with a companion gear 57. This companion bevel gear 57 is slidable longitudinally upon a square shaft 58, and this square shaft 58 carries at its lower extremity a worm wheel 59 suitably driven by a worm 60 (Fig. 9), which worm wheel is associated with a bevel gear 61 engaging companion bevel gears 62 and 63 loosely mounted upon the shaft 64. The bevel gears 63, 62 are alternately adapted for engagement through their clutch elements 65 and 66 respectively with a clutch element 67 splined to the shaft 64 so that depending upon which of the clutch elements 65 or 66 is in engagement with the clutch element 67 the shaft 58 may be rotated in either one direction of rotation or in the opposite direction of rotation.

In the operation of the bucket 37 it may be said that the boom 40 is raised and the bucket is then brought down on top of the material to be loaded, whereupon the rope 50 is actuated to rotate the bucket 37 clockwise, for instance, (Fig. 6), thus to take on a load. Thereupon the boom 40 is raised until the bucket is over the hopper 13, whereupon the rope 50 is actuated to rotate the bucket 37 contraclockwise to discharge its load into the hopper.

In this way a pile of rough material can very quickly be loaded into the hopper practically automatically.

The various features thus far described have set forth the operations of the various elements of the structure, the description having been carried up to the point where the actual driving of the driven elements is effected. Thus the shaft 48 (Fig. 6) controls the raising and lowering of the boom; the shaft 64 controls the rotation of the loading bucket and the shaft 68 drives the elevating drums 12, which drums 12 raise and lower the framework. The interconnections between the shaft 68 and the drums 12 can be traced from the shaft 68, which shaft carries the worms 69 which drive the worm wheels 70 mounted upon the shafts 71, which carry the drums 12. The shaft 68 has a gear 72 meshing with a gear wheel 73, which is fixed to the main drive shaft 64. This gear wheel 72 is loose on the shaft 68, but can be connected therewith through the agency of the clutch 74 operated by the link 75 as will presently appear. The gear wheel 73 which is fastened to the shaft 64 drives a second gear wheel 76 which in turn drives a third gear wheel 77. This gear wheel 77 is loose on the shaft 78 but can be connected therewith through the interposition of the clutch element 79 controlled by the lever 80 to thereby drive the shaft 78 which carries the worm 81. This worm 81 meshes with the worm wheel 82 upon the axle 83 to drive the rear wheels 3, 3. Thus drive shaft 64 may be connected up to drive either the shaft 68 or the shaft 78 as desired.

Figure 12:
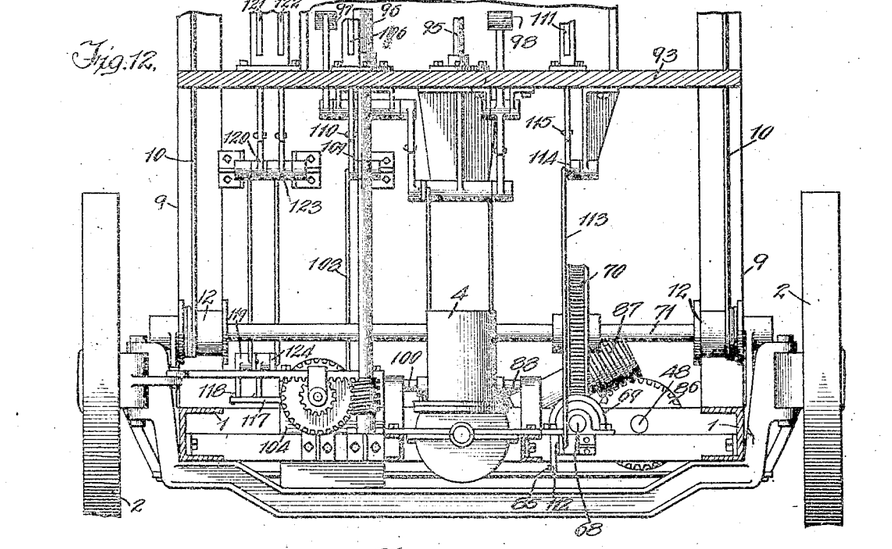
Fig. 12 is a sectional view on line *f—f* of Fig. 1.
Figure 13:
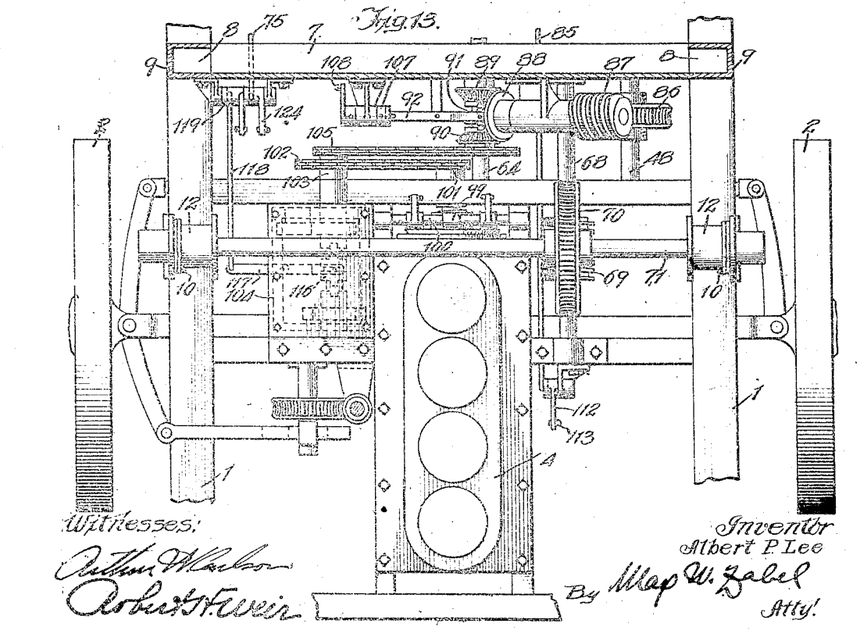
Fig. 13 is a fragmentary sectional top view along line *e* of Fig. 1.

The clutch mechanism 67 is controlled by the arm 84 which is operated by the link 85. Now the shaft 48 which controls the raising and lowering of the boom extends forwardly as shown more clearly in Figs. 12 and 13, where it is provided with a worm 86 meshing with a worm wheel 87, which worm wheel carries a bevel gear 88 meshing with the loose bevel gears 89 and 90. These loose bevel gears may be either one of them connected with the main drive shaft 64 through the interposition of the clutch mechanism 91, which clutch mechanism is controlled by the link 92.

Figures 8, 9:
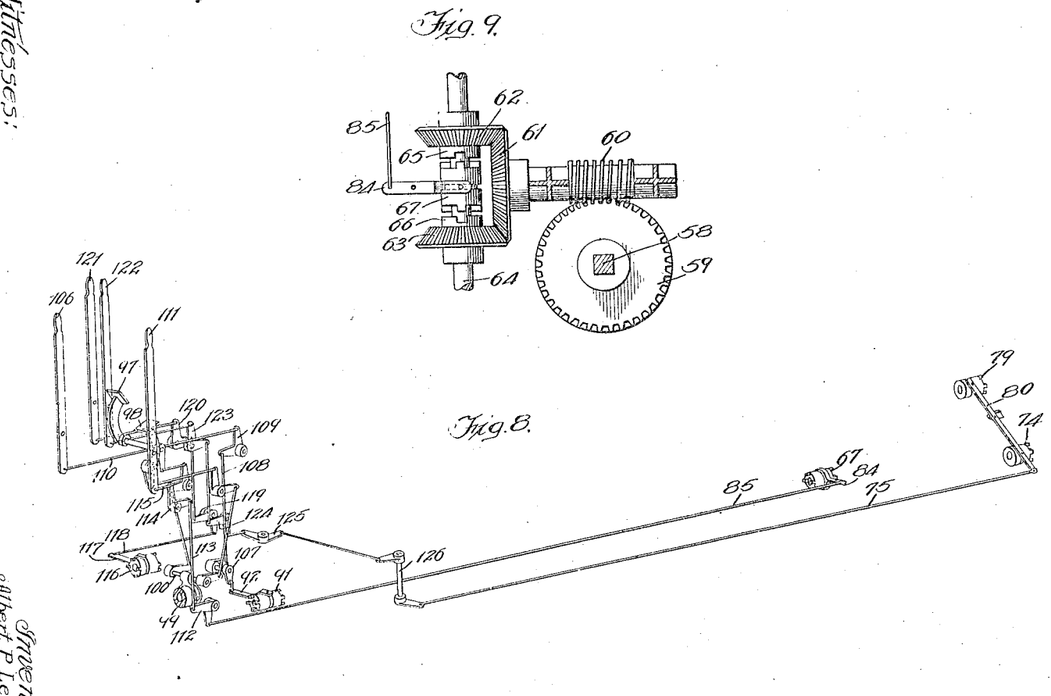
Fig. 8 is a somewhat diagrammatic perspective view of the control features of the device.
Fig. 9 is a detail view of the mechanism which is used to rotate the loading bucket.
Figure 10:
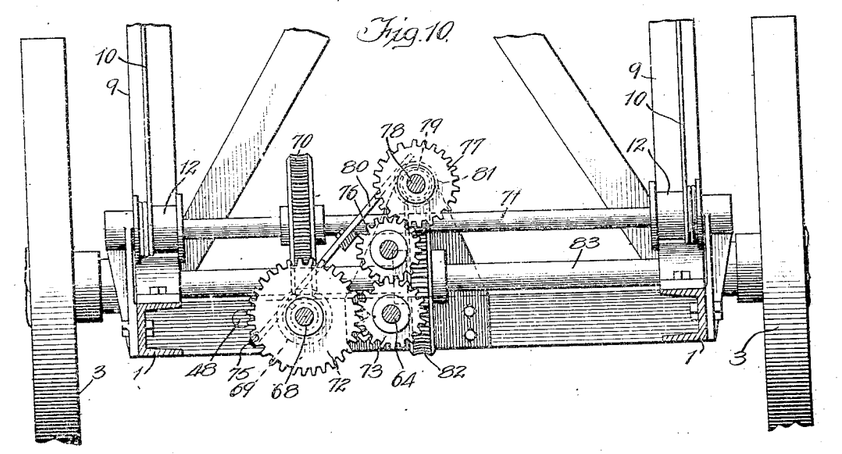
Fig. 10 is a fragmentary sectional view along line *c* of Fig. 1.
Figure 11:
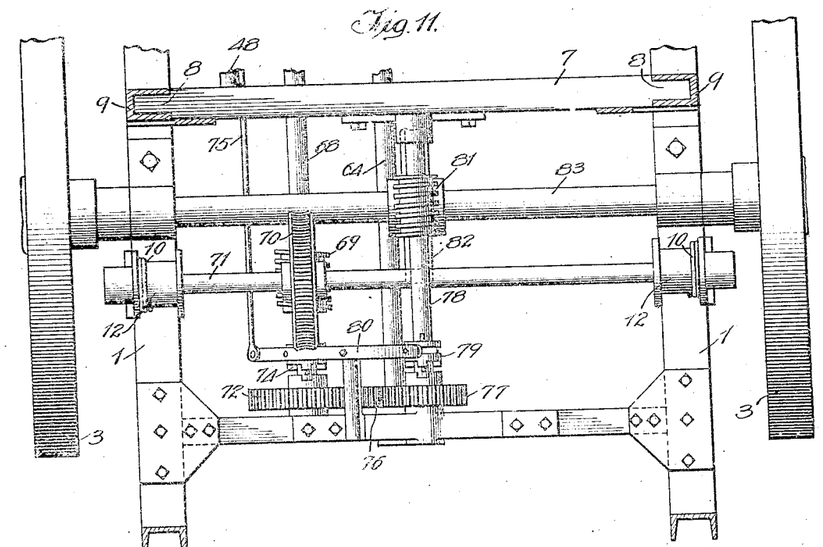
Fig. 11 is a fragmentary sectional view along line *d* of Fig. 1.

Referring now particularly to Fig. 8, it will be seen that the clutch mechanism 91 controls the raising and lowering of the boom. The clutch member 67 controls the revolution of the bucket. The clutch mechanism 79 controls the propelling of the vehicle and the clutch mechanism 74 controls the raising and the lowering of the platform. All of these various clutches are controlled from the front operating floor 93 (Fig. 2) of the vehicle. When the vehicle is being driven the driver occupies the seat 94, but when the vehicle is standing stationary and the device is being operated for loading purposes, the operator occupies the seat 95. The steering wheel 96 of course controls the position of the front wheels 2 as is customary. Foot pedals 97 and 98 are provided operable from either seat to control the main shaft clutch 99. This clutch 99 is operated by a shaft 100 leading through various links and bell crank levers directly to the foot levers 97 and 98 as shown in Fig. 8. The engine shaft 101 by means of a chain 102 drives the shaft 103 leading to the transmission box 104 and also drives the chain 105, which transmits the power to the main drive shaft 64.

It will be noted of course that the clutch members 91, 67, 79, and 74 when thrown in will drive the various devices driven thereby in the direction of rotation controlled from the transmission box 104, and the rotation may of course be in either direction as may be desired to drive the various elements from one to their alternative position or vice versa. The clutch mechanism 91 is controlled by the lever 106 in proximity to the seat 95 through the interposition of the shaft 107, link 108, bell crank lever 109, and link 110. The clutch mechanism 67 is controlled from the lever 111 through the interposition of the bell crank lever 112, link 113, bell crank lever 114, and link 115. The clutch 116 leading to the transmission box is controlled by the link 117, link 118, bell crank lever 119, bell crank lever 120, to the lever 121. The clutches 74 and 79 are controlled by the lever 122 through the interposition of bell crank lever 123, bell crank lever 124, bell crank lever 125, and bell crank lever 126. Thus it will be seen that all of the controlling functions can be carried on from the driver's position 93. The foot levers 97 and 98 control the main clutch from the engine to connect it with the transmission, and the lever 122 by controlling the transmission changes the speed of operation of the main drive shaft 64 and also controls its direction of rotation. The lever 111 controls the rotation of the bucket and the lever 106 controls the raising and lowering of the bucket boom. The lever 122 controls the propelling clutch 79 of the vehicle and also the raising and lowering clutch 74 for the platform 5.

By the term "dumping hopper" as used in the claims I mean a hopper which itself is bodily movable to dump or discharge its contents.

From what has been stated the nature of my invention will be entirely clear to those skilled in the art. It will also be readily apparent that what is described here for illustrative purposes is not intended to limit the broader nature of the invention.

Having however thus described one form in which my invention may be carried out, what I claim as new and desire to secure by Letters Patent is:

1. In a device of the character described the combination with a rolling hopper, a framework for said hopper on which said hopper is adapted to roll to either side of its central position, a loading bucket adapted to scoop and deposit material in said hopper carried by said framework on swinging arms pivoted to said framework at opposite ends of said hopper, means to operate said bucket, and means for raising and lowering said framework.

2. In a device of the character described the combination with a rolling hopper, of a framework for said hopper on which said hopper is adapted to roll to either side of its central position, a loading bucket carried by said framework on swinging arms pivoted to said framework at opposite ends of said hopper, means for moving said bucket from a charge receiving position to a charge delivering position over the hopper, means for rotating said bucket to scoop and take on a charge, and means for raising and lowering said framework.

3. In a device of the character described the combination with a rolling hopper, a framework for said hopper on which said hopper is adapted to roll to either side of its central position, a loading bucket adapted to scoop and deposit material in said hopper carried by said framework on swinging arms pivoted to said framework at opposite ends of said hopper, means to operate said bucket, a runway on said framework for said hopper, and means for tilting said runway.

4. In a device of the character described the combination with a rolling hopper, of a framework for said hopper on which said hopper is adapted to roll to either side of its central position, a loading bucket carried by said framework on swinging arms pivoted to said framework at opposite ends of said hopper, means for moving said bucket from a charge receiving position to a charge delivering position over the hopper, means for rotating said bucket to take on a charge, a runway on said framework for said hopper, and means for tilting said runway.

5. In a device of the character described the combination with a rolling hopper, a framework for said hopper on which said hopper is adapted to roll to either side of of its central position, a loading bucket adapted to scoop and deposit material in said hopper carried by said framework on swinging arms pivoted to said framework at opposite ends of said hopper, means to operate said bucket, means for raising and lowering said framework, a runway on said framework for said hopper, and means for tilting said runway.

6. In a device of the character described the combination with a rolling hopper, of a framework for said hopper on which said hopper is adapted to roll to either side of its central position, a loading bucket carried by said framework on swinging arms pivoted to said framework at opposite ends of said hopper, means for moving said bucket from a charge receiving position to a charge delivering position over the hopper, means for rotating said bucket to take on a charge, means for raising and lowering said framework, a runway on said framework for said hopper, and means for tilting said runway.

7. In a device of the character described the combination with a framework, a rolling hopper bodily movable upon said framework from one side to the other of its central position to thereby discharge its contents, said hopper normally occupying a charge receiving position, a loading bucket adapted to deposit material in said hopper carried by said framework on swinging arms pivoted to said framework at opposite ends of said hopper, means for raising and lowering said framework and means to operate said bucket.

In witness whereof, I hereunto subscribe my name this 5th day of May, A. D. 1915.

ALBERT P. LEE.

Witnesses:
HAZEL A. JONES,
MAX W. ZABEL.